United States Patent Office 3,481,753
Patented Dec. 2, 1969

3,481,753
LIGHT BARIUM CROWN OPHTHALMIC
SEGMENT GLASS
Gordon F. Brewster, Williamson, and Robert A. Weidel, Webster, N.Y., assignors to Bausch & Lomb Incorporated, Rochester, N.Y., a corporation of New York
No Drawing. Filed Mar. 15, 1967, Ser. No. 623,219
Int. Cl. C03c *3/10, 3/04*
U.S. Cl. 106—54　　　　　　　　　　　　　1 Claim

ABSTRACT OF THE DISCLOSURE

Transparent glass containing oxides of silicon, boron, alkali metals, and barium. Useful as segment glass in manufacture of multi-focal lenses for spectacles by fusion to optical crown glass.

DESCRIPTION OF THE INVENTION

In the manufacture of multi-focal ophthalmic lenses by the fusion process one or more glass segments are bonded to a major blank portion of crown glass. The segment and major area glasses have different refractive index values, resulting in a lens having multiple dioptric powers. Generally, the segment glasses have a lower softening point than the major crown glass, so that a preformed blank retains its shape during the fusion of the segment glass to the major blank portion.

A glass composition has been found having numerous desirable properties for use as a segment in a trifocal ophthalmic lens. The light barium crown glass of this invention forms an optical quality bond with a crown glass blank glass composition of the major piece of the lens has a softening point higher than the segment glass, but the coefficient of thermal expansion for all glasses to be fused should be equal. Other advantages of the barium crown glass are high chemical durability and resistance to devitrification during heating. The use of barium oxide in a glass permits an increase in the refractive index without introducing high dispersion color.

The preferred light barium crown glass is made by melting the following components, in weight percentages calculated from their batch ingredients: 45.49 weight percent $SiO_2$, 14.30% $BaO$, 2.98% $ZnO$, 10.32% $Na_2O$, 4.00% $K_2O$, 2.86% $TiO_2$, 5.45% $ZrO_2$, 4.09% $CaO$, and 10.53% $B_2O_3$. The major ingredients, $SiO_2$, $B_2O_3$, $BaO$ and total alkali metal oxide, can be varied slightly for optimum refractive index and expansion control. About two parts per hundred is considered a maximum change in the major ingredients; while about five parts per thousand is considered maximum for the remaining minor ingredients. The oxides of barium and the alkali metals may be introduced as carbonates in the batch. Boron may be added as borax, and sand can supply the silica.

A typical manufacturing schedule for nine pounds of glass includes the steps of (1) mixing the batch ingredients, (2) filling the batch material into a platinum crucible maintained at 2500° F. over a period of 2.5 to 3 hours, (3) stirring the melted glass with a platinum stirrer at 2525° F. for about 18.5 to 19 hours, beginning about one hour after filling, (4) cooling to 2325° F. during the ½ hour before casting, (5) casting the glass melt on preheated molds at 300–400° F., and (6) annealing the cast glass product at 1080° F. with slow cooling to room temperature.

The light barium crown glass produced by the above process has a refractive index ($n_D$) of 1.5880 and Abbe value ($v$) of 52.1. The transmittance of a clear 10 mm. thick sample is about 84 to 90% in the visible waveband. A softening point of 690° C. permits fusion with several commercial optical crown glasses having a higher softening point. The thermal expansion coefficient is about $10.0 \times (19)^{-6}/°$ C. in the range of 25° to 500° C.

A trifocal spectacle lens was made using the light barium crown as an intermediate index segment. The major crown glass piece of the ophthalmic blank was a C.I.T. type 523/586 clear optical glass having a thermal expansion coefficient value matching that of the light barium crown and a third higher index segment glass. The highest dioptric power segment was fused to the major piece and the intermediate segment. This glass was a C.I.T. type 653/423 barium flint having the same softening point as the light barium crown. The fusion can be one of several conventional processes, such as disclosed in U.S. Patent 2,112,659 or 2,963,823, for example. Subsequent grinding, polishing and sedging steps produce a finished multi-focal lens.

We claim:
1. An ophthalmic segment glass consisting essentially of 45.49 weight percent $SiO_2$, 14.30% $BaO$, 2.98% $ZnO$, 10.32% $Na_2O$, 4.00% $K_2O$, 2.86% $TiO_2$, 5.45% $ZrO_2$, 4.09% $CaO$, and 10.53% $B_2O_3$, said glass having a refractive index ($n_D$) of about 1.5880 and an Abbe value ($v$) of about 52.1, and having a softening point of about 690° C. and a thermal expansion coefficient of about $10.0 \times (10)^{-6}/°$ C. in the range of 25° to 500° C.

References Cited

UNITED STATES PATENTS 3,294,561　12/1966　Duncan　——————　106—54

HELEN M. McCARTHY, Primary Examiner

U.S. Cl. X.R.

106—52